US012164036B2

(12) United States Patent
Stiller et al.

(10) Patent No.: US 12,164,036 B2
(45) Date of Patent: Dec. 10, 2024

(54) OBJECT RECOGNITION VIA INDIRECT SIGNAL REFLECTION

(71) Applicant: ZF Active Safety GmbH, Koblenz (DE)

(72) Inventors: Johannes Stiller, Koblenz (DE); Eugen Ziegler, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 742 days.

(21) Appl. No.: 16/691,659

(22) Filed: Nov. 22, 2019

(65) Prior Publication Data
US 2020/0174134 A1 Jun. 4, 2020

(30) Foreign Application Priority Data
Nov. 30, 2018 (DE) .......................... 102018009433.3

(51) Int. Cl.
*G01S 17/931* (2020.01)
*B60W 30/16* (2020.01)
(Continued)

(52) U.S. Cl.
CPC ......... *G01S 17/931* (2020.01); *B60W 30/162* (2013.01); *G01S 13/931* (2013.01);
(Continued)

(58) Field of Classification Search
None
See application file for complete search history.

(56) References Cited

U.S. PATENT DOCUMENTS 9,772,397 B1* 9/2017 Bordes ................. G01S 7/0232
9,798,001 B2 10/2017 Aizawa
(Continued)

FOREIGN PATENT DOCUMENTS

CN         104136298 A    11/2014
DE    102011082203 A1     3/2012
(Continued)

OTHER PUBLICATIONS

Search Report issued in German Appln. No. 102018009433.3 dated Aug. 14, 2019.
(Continued)

*Primary Examiner* — Lail A Kleinman
(74) *Attorney, Agent, or Firm* — ROSSI, KIMMS & McDOWELL LLP (57) ABSTRACT

A control system is suitable for use in a motor vehicle and is configured and intended for detecting a position and/or a speed of an object in the surroundings of the host motor vehicle according to determined objects and/or according to driving-related information concerning other motor vehicles, based on surroundings data from at least one surroundings sensor situated on the host motor vehicle and provided to the control system. Based on these surroundings data, an object in the surroundings of the host motor vehicle is detected, and a virtual position and/or a virtual speed are/is associated with this object. The virtual position and/or speed associated with the object are/is adapted based on the driving-related information concerning another motor vehicle and/or based on driving-related information concerning the host motor vehicle, in order to determine an instantaneous position and/or an instantaneous speed of the object.

16 Claims, 7 Drawing Sheets

(51) Int. Cl.
  *G01S 13/931* (2020.01)
  *G01S 17/42* (2006.01)
  *G01S 17/46* (2006.01)
  *G06V 20/58* (2022.01)

(52) U.S. Cl.
  CPC .............. *G01S 17/42* (2013.01); *G01S 17/46* (2013.01); *G06V 20/58* (2022.01); *G06V 20/582* (2022.01); *G06V 20/584* (2022.01); *G01S 2013/93271* (2020.01)

(56) References Cited

U.S. PATENT DOCUMENTS

| | | |
|---|---|---|
| 2012/0056773 A1 | 3/2012 | Sata |
| 2015/0019080 A1 | 1/2015 | Schneider |
| 2015/0025786 A1 | 1/2015 | Hohm et al. |
| 2015/0130655 A1 | 5/2015 | Aizawa |
| 2017/0008517 A1* | 1/2017 | Himi ................ G01S 15/87 |
| 2017/0162044 A1* | 6/2017 | Hu .................... G06V 20/588 |
| 2017/0285164 A1* | 10/2017 | Kato ................. G01S 13/931 |
| 2018/0046191 A1 | 2/2018 | Keller et al. |
| 2018/0259968 A1 | 9/2018 | Frazzoli et al. |
| 2018/0356820 A1* | 12/2018 | Mori ................ B60W 30/085 |
| 2019/0318177 A1* | 10/2019 | Steinberg ............ G01S 17/58 |
| 2019/0382004 A1* | 12/2019 | Golov ............... B60W 60/001 |
| 2021/0129868 A1* | 5/2021 | Nehmadi ............ G01C 21/26 |
| 2021/0261121 A1* | 8/2021 | Uchida ............... G08G 1/167 |
| 2021/0303879 A1* | 9/2021 | Maucher ............ G06K 9/629 |
| 2021/0311181 A1* | 10/2021 | Chae ................. G01S 13/931 |

FOREIGN PATENT DOCUMENTS

| | | |
|---|---|---|
| DE | 102017007770 | 1/2018 |
| WO | 2018054523 A1 | 3/2018 |

OTHER PUBLICATIONS

Office Action issued in Chinese Appln. No. 201911164523.9 mailed Sep. 28, 2023. English machine translation provided.

Notification of Grant issued in Chinese Appln. No. 201911164523.9 mailed Apr. 12, 2024. English machine translation provided.

* cited by examiner

OBJECT RECOGNITION VIA INDIRECT SIGNAL REFLECTION

RELATED APPLICATION

This application claims priority from German Application No. 10 2018 009 433.3, filed Nov. 30, 2018, the subject matter of which is incorporated herein by reference in its entirety.

BACKGROUND OF THE INVENTION

A control system and a control method for a motor vehicle for determining a position and/or a speed of an object in the surroundings of the motor vehicle are described. The control system and the control method are based in particular on a surroundings sensor system in the motor vehicle for assisting a driver or an autonomously traveling motor vehicle. For semiautonomous motor vehicles and autonomously controlled motor vehicles, the safety and driving comfort of the occupants of the motor vehicle are increased.

PRIOR ART

The detection of certain traffic situations and their correct interpretation represents a key aspect in the present development of (semi)autonomous motor vehicles. In these types of motor vehicles, current advanced driver assistance systems (ADAS) offer numerous monitoring and information functions for driving a motor vehicle in traffic, which is becoming increasingly heavier nowadays, in a safer and more comfortable manner. For this purpose, the surroundings of the motor vehicle are monitored, based on surroundings data obtained from one or more surroundings sensors situated on the motor vehicle.

In particular when traveling on expressways and thruways, risky (quickly executed) lane change or passing maneuvers represent a major accident hazard. The situation may arise that a passing operation by a motor vehicle at a certain point in time is not possible or is at least risky, for example because the motor vehicle is being passed by another motor vehicle. For this reason, the most accurate prediction possible of the instantaneous traffic situation of the motor vehicle makes it possible to minimize critical situations and avoid collisions.

In motor vehicles driven by persons, the driver assistance systems usually provide an information function in order to warn the driver of a critical driving situation or a corresponding maneuver, or to recommend to the driver a suitable maneuver for the host motor vehicle. The driver assistance systems may likewise be used in autonomously controlled motor vehicles in order to provide the autonomous control system with the appropriate surroundings data so that decisions concerning future driving maneuvers of the host motor vehicle may be made.

However, before a control system of the host motor vehicle generates warnings for a driver of the motor vehicle, or before decisions concerning future driving maneuvers can be made, there must be, among other things, an extensive analysis of the instantaneous traffic situation, the participants in this traffic situation, such as the host vehicle or other (further) motor vehicles, as well as the possible future developments of this traffic situation.

For detecting objects in the surroundings of the host motor vehicle, which also include the mentioned other motor vehicles present in the surroundings of the host motor vehicle, surroundings sensors, for example, are used which are able to detect only objects situated in their direct visual range. This also includes reflections on a roadway when the reflective roadway area is also situated in the direct visual range of the surroundings sensor in question. However, in certain driving situations, reflection artifacts of objects in the surroundings of the motor vehicle also occur which are not situated in the direct visual range of the stated surroundings sensor system. These reflection artifacts are regarded as virtual objects by the control system. These virtual objects are generally classified as an interference by the control systems in question, and are removed from a further processing chain.

UNDERLYING PROBLEM

Situations may occur in road traffic that require a driver or an autonomous driver assistance system of a host motor vehicle to carry out a certain driving maneuver. For example, another motor vehicle that is traveling in the passing lane, faster than the host motor vehicle, may prevent a passing operation by the host motor vehicle, since otherwise, a critical situation such as an intense deceleration maneuver by the other motor vehicle or a collision between the host vehicle and the other motor vehicle could occur. In this case, the host motor vehicle itself must be decelerated in order to avoid running up against the other motor vehicle.

The instantaneous traffic situation in which the motor vehicle is in is not constant, and in reality is continually changing. Thus, due to an accident, for example, other road users may intentionally or unintentionally make a lane change or change their speed, which in turn forces the motor vehicle to make a corresponding driving maneuver. Responding to such changes in the instantaneous situation in an appropriate and timely manner represents a major challenge for conventional driver assistance systems as well as for human drivers. However, this requires an efficient and very accurate assessment of the instantaneous traffic situation.

Objects that are recognized by the control system as virtual objects represent an interference, since typically they too must be processed, at least in order to identify then as virtual objects and thereby prevent potentially incorrect calculations.

The object, therefore, is to provide a control system and a control method for a host motor vehicle which, in an instantaneous situation in which the motor vehicle is in, identify virtual objects in the surroundings of the host motor vehicle as such, and adapt or correct their positions and/or speeds in such a way that these positions and/or speeds correspond to those of actually existing objects, which must be taken into account by the control system for a comprehensive assessment of the instantaneous driving situation, and/or which may be utilized for other functions. By taking indirect multiple reflections into account, it is also possible to make such a correction of the speed and/or position of virtual objects that are situated, at least partially or completely, outside a visual range of all or part of the surroundings sensor system. Accordingly, such objects may also be used for assessing the instantaneous traffic situation. An efficiently operating control system and control method are thus provided which increase the driving safety and driving comfort for the motor vehicle.

PROPOSED SOLUTION

This object is achieved by a control system having the features of Claim 1, and a control method having the features of Claim 13.

Preferred embodiments will become apparent from subclaims 2 through 12 and 14 and the following description.

One aspect relates to a control system that is configured and intended for use in a host motor vehicle. This control system, based on surroundings data that are obtained from at least one surroundings sensor associated with the host motor vehicle, determines a position and/or a speed of an object in the surroundings of the host motor vehicle. The at least one surroundings sensor is configured and intended for providing to an electronic control unit of the control system at least information concerning objects and/or driving-related information concerning other motor vehicles in an area in front of, to the side of, and/or behind the host motor vehicle. The control system is at least configured and intended for detecting an object in the surroundings of the host motor vehicle, based on the provided surroundings data, and associating a virtual position and/or a virtual speed with the object, based on the provided surroundings data. Furthermore, the control system is at least configured and intended for adapting the virtual position and/or speed associated with the object, based on driving-related information concerning another motor vehicle and/or based on driving-related information concerning the host motor vehicle, in order to determine an instantaneous position and/or an instantaneous speed of the object.

In certain embodiments, the driving-related information concerning the host motor vehicle may include at least one instantaneous speed of the host motor vehicle, and the driving-related information concerning the other motor vehicle may include at least one instantaneous speed of the other motor vehicle.

The instantaneous speeds of the host motor vehicle and of the other motor vehicle may be longitudinal speeds in each case. Alternatively or additionally, they may be lateral speeds in each case.

The object may be situated at least partially outside a direct detection range of the at least one surroundings sensor. Alternatively or additionally, the object may be situated completely outside a direct detection range of the at least one surroundings sensor.

Within the scope of the present disclosure, reference is made to a direct detection range when there is a direct line (of sight) between the host motor vehicle and the object to be detected. Alternatively, the direct detection range may also be a direct detection range of one or more of the at least one surroundings sensor(s). In this case, reference is made to a direct detection range when there is a direct line of sight between the surroundings sensor in question and the object to be detected.

When, for example, electromagnetic waves such as radar waves are detected by the surroundings sensors, the direct line (of sight) may also be a line along which the radar waves in question are able to directly pass.

According to certain embodiments, the object may include multiple subareas. In these cases, the object may reflect electromagnetic waves, at least on one of the subareas. The control system may be configured and intended for detecting the object in the surroundings of the host motor vehicle as a selection from a plurality of objects and/or as a selection from one of the subareas of the object.

The object and/or the subareas of the object which reflect(s) the electromagnetic wave may be initially identified as such by the control system, i.e., as potential reflectors (reflective surfaces). The control system may detect and continually update the positions of these potential reflective surfaces.

By testing one or more reflection hypotheses with regard to pairs comprising a radar reflector identified in this way and a possible virtual object, the control system may test to determine which objects are actually virtual objects.

The virtual position and/or the virtual speed of the object may be determined based on mirrorings and/or reflections of a signal of the at least one surroundings sensor.

The mirrorings and/or the reflections for detecting the object and/or for determining the virtual position and/or the virtual speed of the object may be analyzed by the control system with regard to their respective signal strength.

In certain embodiments, the control system may also be configured and intended for analyzing the plausibility of the mirrorings and/or the reflections for detecting the object and/or for determining the virtual position and/or the virtual speed of the object.

According to a certain refinement, the control system may also be configured and intended for determining the instantaneous position and/or the instantaneous speed of the object as the ratio of the virtual speed of the object to the instantaneous speed of the host motor vehicle.

The object may be a further motor vehicle and/or a road sign and/or a sign gantry and/or a virtual object.

The control system may also be configured and intended for testing reflection hypotheses in each case with regard to a pair comprising the virtual object and the further motor vehicle and/or the road sign and/or the sign gantry, in order to distinguish the virtual object from the further motor vehicle and/or the road sign and/or the sign gantry.

The at least one surroundings sensor may include a radar sensor and/or a lidar sensor. Alternatively or additionally, the at least one surroundings sensor may include a camera or an ultrasonic sensor.

A further aspect relates to a motor vehicle that includes a control system as described above.

Yet another aspect relates to a control method which in a motor vehicle detects a position and/or a speed of an object in the surroundings of the host motor vehicle, based on surroundings data obtained from at least one surroundings sensor situated on the motor vehicle. The control method is carried out in particular by means of a control system as described above. The control method comprises at least the following steps:

detecting an object in the surroundings of the host motor vehicle, based on the provided surroundings data, associating a virtual position and/or a virtual speed with the object, based on the provided surroundings data, and adapting the virtual position associated with the object and/or the virtual speed associated with the object, based on driving-related information concerning another motor vehicle and/or based on driving-related information concerning the host motor vehicle, in order to determine an instantaneous position and/or an instantaneous speed of the object.

Compared to driver assistance systems and other control systems used in motor vehicles for (semi)autonomous driving, the approach presented here increases the driving safety and driving comfort, since, based on the information contained in the surroundings data in the area in front of, to the side of, and/or behind the host motor vehicle, the entire surroundings of the host motor vehicle, and thus the instantaneous traffic situation, are continuously and comprehensively taken into account by the control system in order to determine the instantaneous position and/or speed of an object. This may initially involve the virtual position and/or the virtual speed of an object that is not situated in the direct visual range of at least one individual sensor of the at least one surroundings sensor. The virtual position and/or the virtual speed of the object are/is adapted in such a way that they/it correspond(s) in each case to the instantaneous position and/or speed of the object. Virtual objects not situated in the visual range of a sensor may thus be correctly taken into account in the further processing chain. Compared to conventional control systems, improved predictions concerning the instantaneous surroundings situation of the motor vehicle may thus be made.

It is apparent to those skilled in the art that the aspects and features described above may be arbitrarily combined in a control system and/or a control method. Although some of the above-described features have been described with regard to a control system, it is understood that these features are also applicable to a control method. Similarly, the features described above with regard to a control method are correspondingly applicable to a control system.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

DETAILED DESCRIPTION OF THE DRAWINGS

Within the scope of the following disclosure, certain aspects are described primarily with regard to the control system. However, these aspects are of course also applicable within the scope of the disclosed control method, which may be carried out, for example, by a central control device (ECU) of a motor vehicle. This may take place by making suitable write and read access to a memory associated with the motor vehicle. The control method may be implemented within the motor vehicle as hardware or software, and also as a combination of hardware and software. Also included are digital signal processors, application-specific integrated circuits, field-programmable gate arrays, and other suitable switching and computing components.

Figure 1:
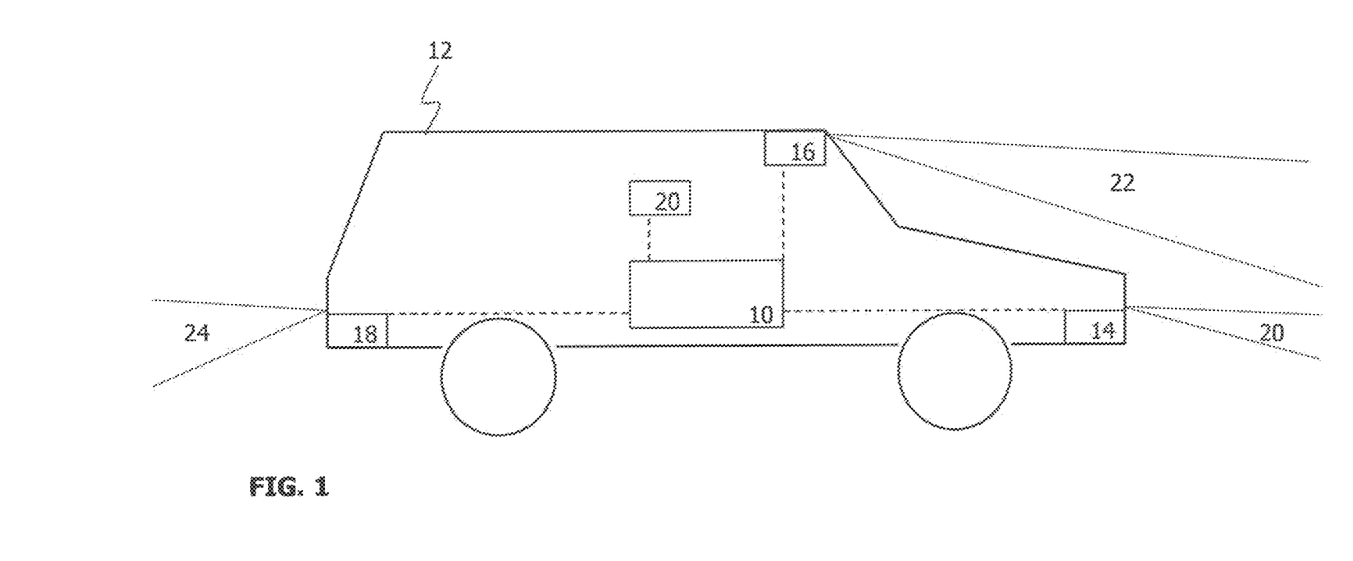
FIG. 1 schematically shows a motor vehicle that has a control system and at least one surroundings sensor according to certain exemplary embodiments.

FIG. 1 schematically shows a motor vehicle 12 (host motor vehicle) that includes a control system 10. The control system 10 is coupled to at least one surroundings sensor 14, 16, 18 situated on the motor vehicle 12 in order to obtain surroundings data from the at least one sensor 14, 16, 18. The control system 10 may include an electronic control unit (ECU), not illustrated in the figure. For example, the present control system 10 may be at least configured and intended, with the aid of the ECU and/or other electronic control systems, for determining a position and/or a speed of an object that is in an instantaneous driving situation of the host motor vehicle 12, in the surroundings thereof. For example, the ECU receives signals from the surroundings sensors 14, 16, 18, processes these signals and the associated surroundings data, and generates control signals and/or output signals.

FIG. 1 illustrates three surroundings sensors 14, 16, 18 which transmit appropriate signals to the control system 10 or the electronic control unit ECU. In particular, at least one surroundings sensor 14 that detects an area 20 in front of the motor vehicle 12 is situated on the motor vehicle 12 facing the front in the travel direction of the motor vehicle 12. This at least one surroundings sensor 14 may be situated, for example, in the area of a front bumper, a front light, and/or a front radiator grill of the motor vehicle 12. Thus, the surroundings sensor 14 detects an area 20 directly in front of the motor vehicle 12.

At least one additional or alternative surroundings sensor 16, likewise facing the front in the travel direction of the motor vehicle 12, is situated in the area of the windshield of the motor vehicle 12. For example, this surroundings sensor 16 may be situated between a rearview mirror of the motor vehicle 12 and its windshield. Such a surroundings sensor 16 detects an area 22 in front of the motor vehicle 12; depending on the design of the motor vehicle 12, an area 22 directly in front of the motor vehicle 12 cannot be detected due to the front section (or geometry) of the motor vehicle 12.

In addition, at least one surroundings sensor 18 may be situated at the side and/or the rear of the motor vehicle 12. This optional surroundings sensor 18 detects an area 24 to the side of and/or behind the motor vehicle 12 in the travel direction of the motor vehicle 12. For example, the data or signals of this at least one surroundings sensor 18 may be used to verify information that is detected by the other surroundings sensors 14, 16, and/or to determine a curvature of a lane traveled on by the motor vehicle 12.

The at least one surroundings sensor 14, 16, 18 may be implemented in any desired manner, and may include a front camera, a rear camera, a side camera, a radar sensor, a lidar sensor, an ultrasonic sensor, and/or an inertial sensor. For example, the surroundings sensor 14 may be implemented in the form of a radar, lidar, or ultrasonic sensor or in the form of a front camera. A front camera is particularly suited for the surroundings sensor 16 situated at a higher level, whereas the surroundings sensor 18 situated in the rear of the motor vehicle 12 may be implemented in the form of a radar, lidar, or ultrasonic sensor or in the form of a rear camera and/or side camera.

The electronic control unit ECU processes the surroundings data obtained from the surroundings sensor(s) 14, 16, 18 situated on the motor vehicle 12 in order to detect a lane traveled on by the motor vehicle 12 via a first and a second lateral lane marking in front of the motor vehicle 12. In addition, the electronic control unit ECU processes the surroundings data obtained from the surroundings sensor(s) 14, 16, 18 situated on the motor vehicle in order to detect a lane traveled on by another motor vehicle (the lane adjacent to the lane traveled on by the host vehicle, where "adjacent" means that one or more further lanes may also be situated between the adjacent lanes), and its lateral lane markings in front of the motor vehicle. For this purpose, the surroundings sensors 14, 16, 18 provide surroundings data to the electronic control unit ECU that represent the area in front of, to the side of, and/or behind the vehicle. To this end, the control system 10 is connected to the at least one surroundings sensor 14, 16, 18 via at least one data channel or bus (illustrated by dashed lines in FIG. 1). The data channel or bus may be implemented in a wired or wireless manner.

Alternatively or additionally, the control system 10 or its electronic control unit ECU may obtain data from one or more other assistance systems 20 or some other control unit 20 of the motor vehicle 12 which indicate or allow the derivation of the lanes traveled on by the host vehicle, the other vehicle, and further motor vehicles via their lateral lane markings. Thus, data and information already determined by other systems may be used by the control system 10.

In addition, the control system 10 or its electronic control unit ECU determines a driving situation with the surroundings sensors, i.e., based on the surroundings data obtained using the at least one surroundings sensor 14, 16, 18. Here as well, an assistance system 20 or an electronic control unit 20 that is already present may alternatively or additionally supply data and/or information which define(s) a driving situation, or from which a driving situation may be quickly derived. A position and/or a speed of an object in the surroundings of the host motor vehicle 12 are/is subsequently determined, depending on the determined driving situation.

The driver assistance system 20 or the electronic control unit 20 may also be configured and intended for (semi) autonomously controlling the motor vehicle. In this case, the control system 10 is configured and intended for outputting data to the driver assistance system 20 or to the electronic control unit 20 for autonomous driving. In particular, the control system 10 (or its ECU) may output data that indicate to the component 20 a position and/or a speed of an object in the surroundings of the host motor vehicle 12 in an instantaneous driving situation (also a traffic situation). The data may likewise be transmitted via a data channel or bus in a wired or wireless manner.

Figure 2:
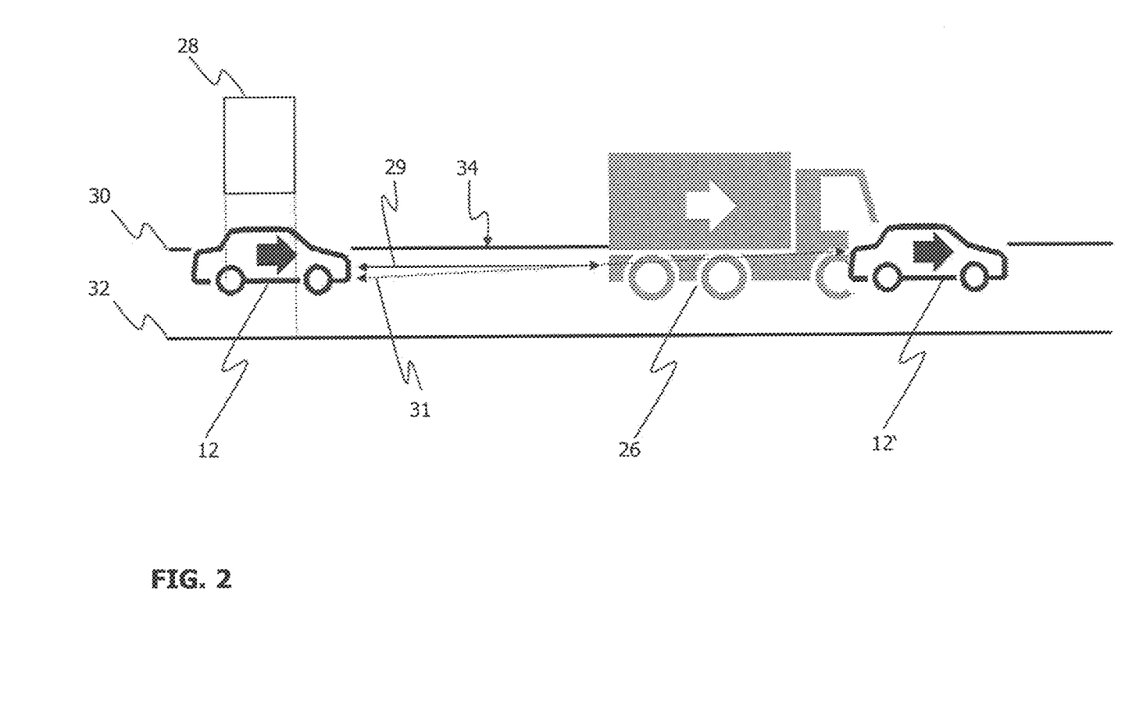
FIG. 2 schematically shows a driving situation in which a motor vehicle that is following behind another motor vehicle travels beneath a sign gantry, and a virtual object according to certain exemplary embodiments.

FIG. 2 schematically shows a driving situation in which the host motor vehicle 12 is traveling behind another motor vehicle 26 on a roadway 34 (following travel). In this example the other motor vehicle 26 is a truck, although the present disclosure is not limited thereto. Thus, the other motor vehicle 26 may alternatively be a passenger vehicle or other road users. In the driving situation shown in FIG. 2, the motor vehicles 12, 26 may be traveling at the same or different speeds.

The roadway 34 is delimited by lateral lane markings 30 (left) and 32 (right). The roadway 34 may, but does not have to, have multiple lanes. During the following travel, the host motor vehicle 12 and the other motor vehicle 26 may be in the same lane of the roadway 34 or in different lanes of the roadway 34.

In the example shown in FIG. 2, the control system 10 of the host motor vehicle 12 detects the other motor vehicle 26 by means of the at least one surroundings sensor 14, 16, 18. For this purpose, at the host motor vehicle 12 at least one sensor signal 29 is emitted in the direction of the other motor vehicle 26. In the present case the sensor signal is an electromagnetic wave such as a radar wave, for example, although the present disclosure is not limited thereto.

In this way the control system 10 determines, among other things, a lateral distance of the other motor vehicle 26 (or of its longitudinal axis) from an actually present center line (detected by the at least one surroundings sensor 14, 16, 18) or a virtual center line of the lane of the roadway 34 being traveled on at the moment, as well as a distance along the roadway 34 (longitudinal distance) between the host motor vehicle 12 and the other motor vehicle 26. In addition, the control system 10 may determine the lateral speed and longitudinal speed as well as the lateral acceleration and longitudinal acceleration of the other motor vehicle 26.

In the driving situation illustrated in FIG. 2, at that moment the host motor vehicle is traveling under a sign gantry 28. As mentioned above, prior to traveling past the sign gantry, initially only the preceding other motor vehicle 26 or its driving-related information, such as an instantaneous distance from the host motor vehicle 12 and speeds and/or accelerations of the other motor vehicle 26, is detected by means of the sensor signal 29 and the control system 10.

At the point in time at which the host motor vehicle 12 actually travels under the sign gantry, reflections (also referred to as mirrorings) of the sensor signal 29 and/or of other sensor signals (not shown in FIG. 2) result which are detected by the at least one surroundings sensor 14, 16, 18. From the viewpoint of the control system 10, this results in the detection of at least one further object in the form of a virtual motor vehicle 12', i.e., not existing in reality. The double arrow 31 in FIG. 2 clarifies that this virtual object 12' is regarded by the control system as an object at a distance from the host motor vehicle 12; the virtual object 12' thus has a greater longitudinal speed than the host motor vehicle 12.

The resulting reflections are now described with reference to FIG. 3. In addition to the sensor signal 29 for detecting the other motor vehicle 26, which has already been described with reference to FIG. 2, in this case by way of example at least one further electromagnetic signal is additionally emitted at the host motor vehicle 12 in the direction of the other motor vehicle 26. In the example shown in FIG. 3, this is a radar wave 36. The radar wave 36 is reflected at the rear (i.e., on a portion of the rear end that reflects electromagnetic waves) of the other motor vehicle 26, and due to the angle of incidence is reflected back as a reflected radar wave 36' in the direction of the sign gantry 28. In addition, the sign gantry is at least partially made of a material that reflects electromagnetic waves. The reflected radar wave 36' strikes the sign gantry 28, from which it is reflected back as a newly reflected wave 36" in the direction of the rear of the other motor vehicle 26. At this location a reflection once again takes place, this time in the direction of the motor vehicle 12, so that a reflected signal 36''' is ultimately detected by the at least one surroundings sensor 14, 16, 18, and the corresponding data are provided to the control system 10. In the example shown in FIG. 3, for the sake of clarity only one output signal (the radar wave 36) is illustrated, which is then reflected a total of three times before it is detected by the at least one surroundings sensor. However, it is understood that the present disclosure is not limited thereto, and the at least one surroundings sensor may detect any given number of reflections of any given number of output signals emitted at the host motor vehicle 12, and may provide them to the control system 10.

Since the control system 10 initially cannot distinguish such multiply reflected output signals at the at least one surroundings sensor 14, 16, 18 from output signals, which have been reflected only once (for example, at the rear of the other motor vehicle) and thus correspond to a distance between the host motor vehicle 12 and the other motor vehicle 26 that is actually present, based on the output signal 36 the control system 10 detects only the virtual object 12' illustrated in FIG. 2. The position of this virtual object 12' is situated at the position of the preceding vehicle (see FIG. 2). This is due to the fact that the origin of the virtual object in a (mirrored) reflection is situated at the other motor vehicle 26 and at the sign gantry. In addition, due to the detected reflections, a speed that is least relatively greater than that of the host motor vehicle 12 is associated with the object 12'. The relative velocity vector between the virtual object 12' and the host motor vehicle 12 thus points away from the host motor vehicle 12, i.e., in the travel direction of the virtual object 12'. This also results (at subsequent detection times) in a change in the position of the virtual object 12' in such a way that the distance between the host motor vehicle 12 and the virtual object 12' increases at each point in time of detection. In this way, the control system 10 derives a (virtual) motor vehicle 12' that is traveling away from the host motor vehicle 12 (indicated by the double arrow 31 in FIG. 2).

Figure 3:
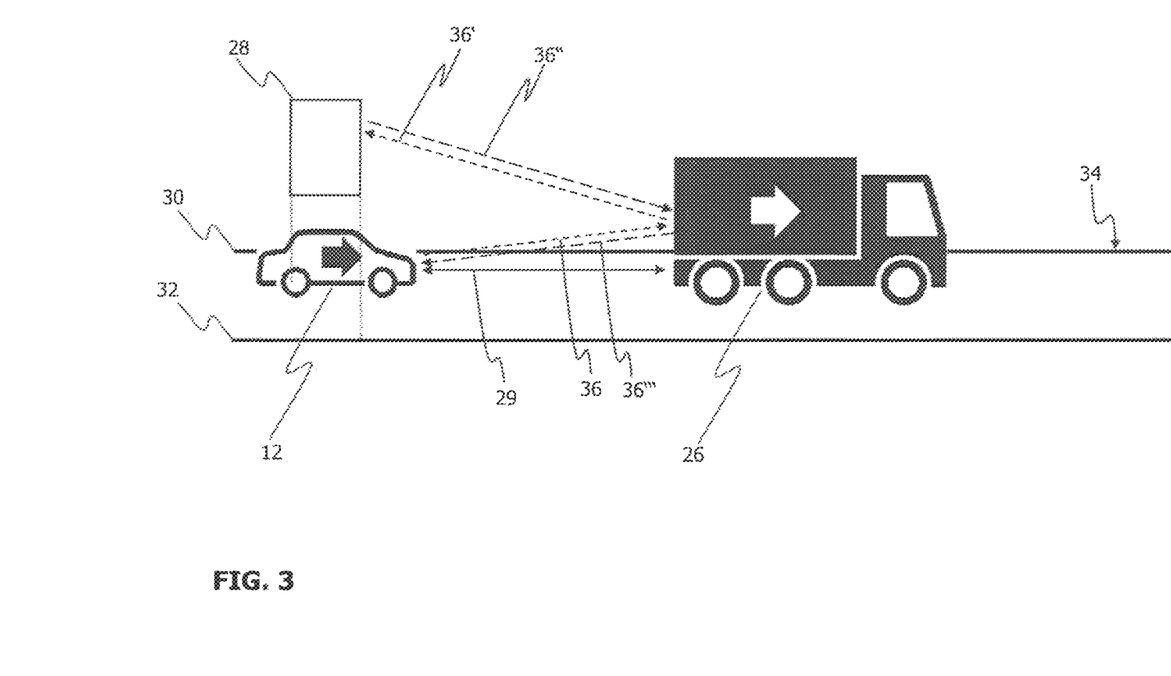
FIG. 3 schematically shows a driving situation in which a motor vehicle that is following behind another motor vehicle travels beneath a sign gantry, and multiply reflected signals according to certain exemplary embodiments.

The virtual object 12', as shown in FIG. 3 [sic; 2], results from the occurrence of mirrorings and/or reflections on real objects. The control system 10 may be configured and intended for identifying real objects or individual subareas thereof which are able to reflect electromagnetic waves such as radar or laser beams, for example based on provided data of the at least one surroundings sensor 14, 16, 18. Within the scope of the present disclosure, these real objects or their corresponding subareas are also referred to as identified radar reflectors.

The virtual object 12' involves incorrect information for the control system 10, which, for example, may be recognized and suppressed for a further processing chain. According to the present disclosure, however, it is possible to determine the position and/or speed of such a real object based on the information concerning the reflected signals, i.e., the multiple reflections of the signals emitted at the host motor vehicle 12. For this purpose, at least one speed, in the present case the longitudinal speed of the other motor vehicle 26 by way of example, is calculated using the emitted sensor signal 29 and based on the surroundings data obtained by the at least one surroundings sensor 14, 16, 18 and provided to the control system 10. In addition, the control system 10 is provided in a suitable manner with an instantaneous speed of the host motor vehicle 12. Based on each of these speeds, i.e., the correctly reconstructed speed of the other motor vehicle 26 as well as the speed of the host motor vehicle 12, an instantaneous (actual) position and an instantaneous (actual) speed of the virtual object 12' may then be determined.

Figure 4:
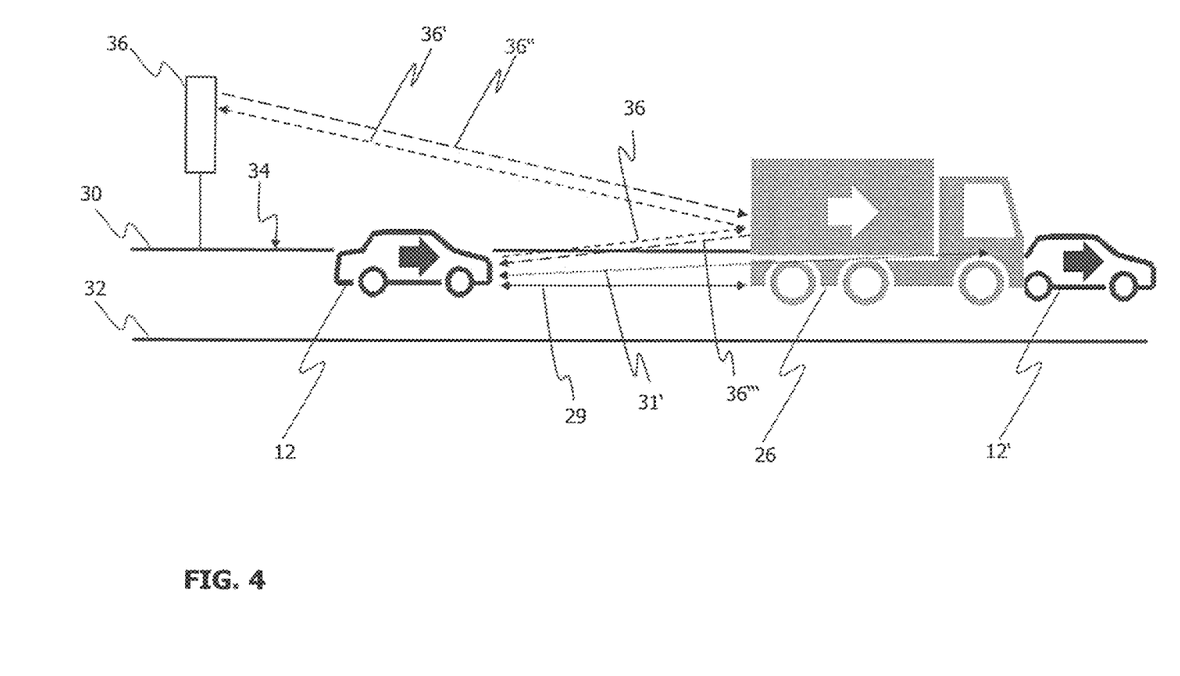
FIG. 4 schematically shows a driving situation in which a motor vehicle that is following behind another motor vehicle passes by a reflective object on the roadside, and multiply reflected signals according to certain exemplary embodiments.

According to another example illustrated in FIG. 4, this approach may also be followed when traveling past a road sign situated on the roadside. In the driving situation from FIG. 4, the host motor vehicle 12 is once again traveling behind the other motor vehicle 26 on a roadway 34 that is delimited by a left roadway marking 30 and a right roadway marking 32. A road sign 36 is illustrated in the area of the left roadway marking 30.

In addition to the sensor signal 29 for detecting the other motor vehicle 26, previously described with reference to FIG. 2, here as well by way of example at least one further electromagnetic signal is additionally emitted at the host motor vehicle 12 in the direction of the other motor vehicle 26. In the example shown in FIG. 4, this involves a radar wave 36. The radar wave 36 is reflected back at the rear end or at a portion of the rear end of the other motor vehicle 26, which due to the angle of incidence reflects electromagnetic waves as a reflected radar wave 36' in the direction of the road sign 36. The road sign is also made, at least partially, of material that reflects electromagnetic waves. The reflected radar wave 36' strikes the road sign 36, and from there is reflected back as a newly reflected wave 36" in the direction of the rear of the other motor vehicle 26. At that location the next reflection takes place in the direction of the host motor vehicle 12, so that a reflected signal 36''' is ultimately detected by the at least one surroundings sensor 14, 16, 18, and the corresponding data are provided to the control system 10. In addition, in the example shown in FIG. 4, for the sake of clarity only one output signal (the radar wave 36) is illustrated, which is then reflected a total of three times before it is detected by the at least one surroundings sensor 14, 16, 18. However, it is understood that the present disclosure is not limited thereto, and the at least one surroundings sensor 14, 16, 18 may detect any given number of reflections of any given number of output signals at the host motor vehicle 12, and may provide them to the control system 10. From the viewpoint of the control system 10 of the host motor vehicle 12, in addition to the detection of the other motor vehicle 26 and its driving-related data, this once again results in the virtual object 12' with a greater speed than the host motor vehicle 12, and a position which over a certain detection period moves away from the host motor vehicle 12, i.e., results in an increasingly greater distance between the host motor vehicle 12 and the virtual object 12' (indicated by the double arrow 31' in FIG. 4). However, this detection principle is not limited to the road sign 36 from FIG. 4 and/or the sign gantry 28 from FIG. 3. Rather, all objects present in an instantaneous driving situation of the host motor vehicle 12, for example prompted by the provided surroundings data, are identified by the control system 10 as potential reflectors for electromagnetic signals (radar reflectors, for example).

Figure 5:
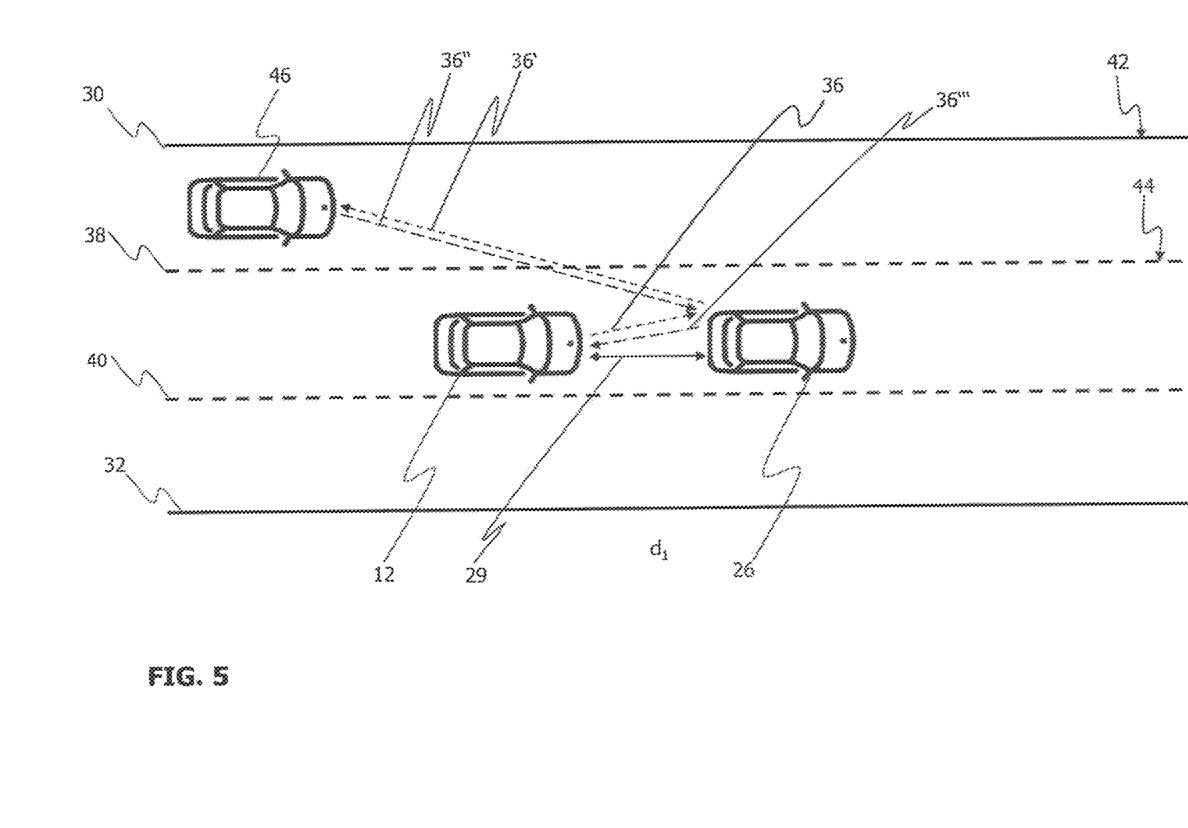
FIG. 5 schematically shows a driving situation in which a motor vehicle that is following behind another motor vehicle is passed by a further motor vehicle, and multiply reflected signals according to certain exemplary embodiments.
Figure 6:
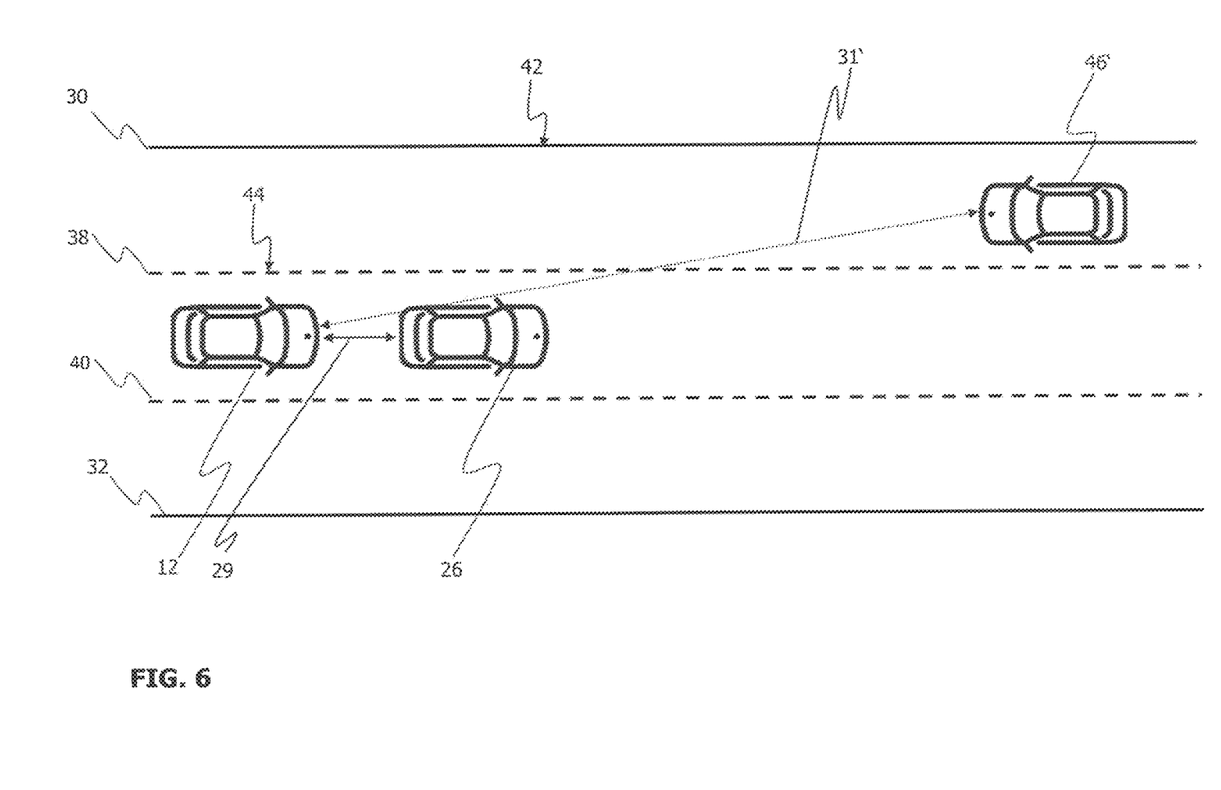
FIG. 6 schematically shows the driving situation from FIG. 5 from the viewpoint of a control system according to certain exemplary embodiments.

Another example in which the above-described detection principle is used is illustrated in a top view with reference to FIGS. 5 and 6. The host motor vehicle 12 is traveling in a center lane 44 of a three-lane roadway, behind the other motor vehicle 26 (following travel) (in the example according to FIG. 5, a passenger vehicle). Alternatively, the other motor vehicle 26 may be a stationary motor vehicle. A further motor vehicle 46 is approaching from the rear in the left lane 42 of the three-lane roadway at a greater speed than the host motor vehicle 12. The further motor vehicle 46 is thus carrying out a passing operation.

Similarly to the example illustrated with reference to FIG. 4, the control system 10, based on the provided surroundings data of the at least one surroundings sensor 14, 16, 18, is able to identify the further motor vehicle 46 or subarea thereof as reflectors for electromagnetic waves. In addition, the host motor vehicle 12 detects the other motor vehicle 26 (and the distance from the host motor vehicle 12) as well as the driving-related information of the other motor vehicle 26.

Here as well, the electromagnetic output signal 36, which is emitted in the front area of the host motor vehicle, prompted by the control system 10, for example, undergoes a total of three reflections (similarly to the example from FIG. 4) before it is detected [by] the at least one surroundings sensor 14, 16, 18. The first and third reflections (which supply the signals 36' and 36''', respectively) once again take place at the rear of the other motor vehicle 26. The second reflection, from which the signal 36" results, occurs in the front area of the passing further motor vehicle 46.

From the viewpoint of the control system, however, the situation is as shown in FIG. 6. Accordingly, the control system 10 detects the further motor vehicle 46 as a virtual oncoming motor vehicle 46'. This is indicated by the double arrow 31' in FIG. 6. However, the real object corresponding to the virtual object 46' approaches from the rear in the form of the passing further motor vehicle 46 (see FIG. 5).

The control system 10 is able to identify the virtual object 46' as such. This may take place, for example, via a plausibility check of the driving-related information determined for the virtual object, such as the distance from the host motor vehicle 12 and/or the relative speed and/or the relative acceleration between the host motor vehicle and the virtual object 46', and/or via measured angles between a longitudinal axis of the host motor vehicle 12 and a radial distance vector between the host motor vehicle 12 and the virtual object 46'. Changes in the above-mentioned parameters between successive detection cycles may also be included in the plausibility check. Further options for the plausibility check involve an analysis of signals (i.e., also reflections), detected by the at least one surroundings sensor 14, 16, 18, with regard to their signal amplitude and/or a radar cross section.

As soon as the virtual object 46' has been identified in this way, the position determined for this purpose and/or the associated speed are/is adapted in such a way that the actual position and/or the actual speed of the real object are/is calculated in the form of the further motor vehicle 46. This calculation is in turn based on the instantaneous speed of the host motor vehicle 12 that is provided to the control system 10. Alternatively, this calculation may be based on the correctly reconstructed speed of the preceding vehicle 26 which is obtained via the sensor signal 29, for example. The passing further motor vehicle 46 may thus be correctly detected with regard to its position and its speed, and optionally also with regard to its acceleration, without being present in the direct visual range of surroundings sensors 14, 16 situated at the front of the host motor vehicle 12.

Based on this position information and speed information concerning the further motor vehicle 46, for example the driver assistance system 20 of the host motor vehicle 12 may then appropriately respond to a passing operation without using a reception signal of the at least one surroundings sensor 14, 16, 18 that is situated in the direct visual range of the surroundings sensor in question. The driver assistance system 20 may then, for example, warn a driver of the host motor vehicle 12 about him/herself initiating a passing operation at this point in time. For autonomously traveling motor vehicles, a potentially imminent swerving maneuver into the left lane 42, in which the further motor vehicle 46 at that moment is passing at a greater speed, is prevented.

Figure 7:
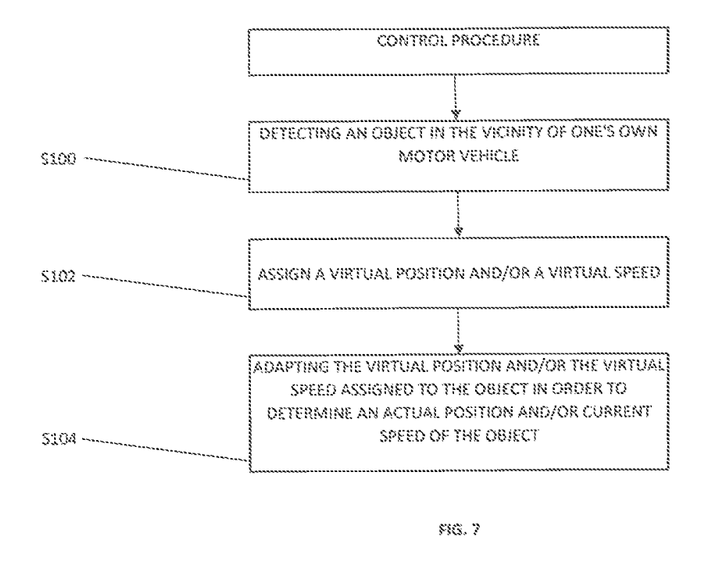
FIG. 7 shows a flow chart for a control method according to certain exemplary embodiments.

FIG. 7 shows a flow chart for a control method which, based on surroundings data obtained from at least one surroundings sensor situated on a host motor vehicle 12, determines a position and/or a speed of an object in the surroundings of the host motor vehicle. The control method may be carried out, for example, by the above-described control system 10 of the host motor vehicle 12. All features described within the scope of the control system may also be used for the control method. In particular, all of the above-described features with regard to the identification of electromagnetic waves [on] reflective surfaces, the determination of driving-related information concerning the other motor vehicle 12, and taking into account multiple reflections for which the reflective surfaces are situated, at least partially, outside a direct visual range of the at least one surroundings sensor, are applicable to the control method.

An object in the surroundings of the motor vehicle 12 is detected in a first step S100, based on the provided surroundings data. A virtual position and/or a virtual speed are/is then associated with the object in a step S102, based on the provided surroundings data. In this way, a virtual object together with the position information and speed information is thus detected by the control system 10.

Lastly, the virtual position associated with the object and/or the virtual speed associated with the object are/is adapted in a step S104, based on driving-related information concerning another motor vehicle. Alternatively or additionally, the virtual position associated with the object and/or the virtual speed associated with the object may be adapted based on driving-related information concerning the host motor vehicle. In both cases, an instantaneous position and/or an instantaneous speed of the object are/is determined via this adaptation. In this way, based on the virtual object, speed information and/or position information concerning an object that in reality exists in the surroundings of the host motor vehicle 12 are/is determined by the control system 10, to which suitable control systems (the driver assistance system, for example) of the host motor vehicle 12 may then appropriately respond.

It is understood that the exemplary embodiments explained above are not exhaustive, and do not limit the subject matter disclosed herein. In particular, it is apparent to those skilled in the art that they may combine the features of the various embodiments with one another and/or omit various features of the embodiments without thereby departing from the subject matter disclosed herein.

The invention claimed is:

1. A control system (10) for a host motor vehicle (12) comprising an electronic control unit (20), the control system configured to determine a position and/or a speed of an object in the surroundings of the host motor vehicle (12), based on surroundings data that are obtained from at least one surroundings sensor (14, 16, 18) situated on the host motor vehicle, wherein the at least one surroundings sensor (14, 16, 18) is configured to provide to the electronic control unit of the control system (10) at least information concerning objects and/or driving-related information concerning other motor vehicles in an area (20, 22, 24) in front of, to the side of, and/or behind the host motor vehicle (12), and wherein the control system (10) is further configured to:
  detect an object based on a signal emitted by the at least one surroundings sensor (14, 16, 18) mirroring and/or reflecting off another motor vehicle (26) different from the host motor vehicle (12), or another reflective surface,
  associate a virtual position and/or a virtual speed with the detected object, based on the emitted signal mirroring and/or reflecting off the another motor vehicle (26) or the another reflective surface,
  determine whether the detected object corresponds to a non-existent another object, corresponding to a reflection of the signal emitted by the host motor vehicle from the another reflective surface, or a real object, corresponding to the another motor vehicle, situated at least partially outside a direct detection range of the at least one surroundings sensor (14, 16, 18) in the surroundings of the host motor vehicle (12), based on the provided surroundings data, the virtual position, and/or the virtual speed of the detected object, remove the detected object in a case where it is determined that the detected object corresponds to the non-existent another object,
adapt the virtual position and/or the virtual speed position associated with the detected object in a case where it is determined that the detected object corresponds to the real object, based on driving-related information concerning the another motor vehicle (26) and driving-related information concerning the host motor vehicle (12), in order to determine an instantaneous position and/or an instantaneous speed of the real object corresponding with the detected object, and
respond to a passing operation of the real object by relying on the determined instantaneous position and/or the determined instantaneous speed of the real object and without the real object being within a direct detection range of the at least one surroundings sensor (14, 16, 18) providing the surroundings data, wherein responding to the passing operation comprises controlling the host motor vehicle by preventing a lane change of the host motor vehicle in response to the determined instantaneous position and/or the determined instantaneous speed of the real object.

2. The control system according to claim 1, wherein the driving-related information concerning the host motor vehicle (12) includes at least one instantaneous speed of the host motor vehicle (12), and wherein the driving-related information concerning the other motor vehicle (26) includes at least one instantaneous speed of the other motor vehicle (26).

3. The control system (10) according to claim 1, wherein the real object is situated completely outside a direct detection range of the at least one surroundings sensor (14, 16, 18).

4. The control system (10) according to claim 1, wherein the real object includes multiple subareas, wherein the real object reflects electromagnetic waves at least on one of the subareas, and wherein the control system is further configured to detect the real object in the surroundings of the host motor vehicle as a selection from a plurality of objects and/or as a selection from one of the subareas of the real object.

5. The control system (10) according to claim 1, further configured to analyze the mirrorings and/or the reflections for detecting the object and/or for determining the virtual position and/or the virtual speed of the detected object with regard to their respective signal strength.

6. The control system (10) according to claim 1, further configured to analyze the plausibility of the mirrorings and/or the reflections that detect the object and, based on the plausibility analysis, determine whether the detected object is a non-existent another object or a real object.

7. The control system (10) according to claim 1, further configured to determine the instantaneous position and/or the instantaneous speed of the real object as the ratio of the virtual speed of the detected object to the instantaneous speed of the host motor vehicle (12).

8. The control system (10) according to claim 1, further configured to test reflection hypotheses in each case with regard to a pair comprising the detected object and the another motor vehicle and/or the another reflective surface, in order to determine whether the detected object is the non-existent another object, corresponding to a reflection of the host motor vehicle (12) from the another reflective surface, or the real object.

9. The control system (10) according to claim 1, wherein the at least one surroundings sensor (14, 16, 18) includes a radar sensor and/or a lidar sensor.

10. A motor vehicle (12) that includes a control system (10) according to claim 1.

11. A control method for determining a position and/or a speed of an object in surroundings of a host motor vehicle (12), based on surroundings data that are obtained from at least one surroundings sensor (14, 16, 18) situated on the host motor vehicle (12), wherein the at least one surroundings sensor (14, 16, 18) provides at least information concerning objects and/or driving-related information concerning other motor vehicles in an area (20, 22, 24) in front of, to the side of, and/or behind the host motor vehicle (12), and wherein the control method comprises at least the following steps:
detecting an object based on a signal emitted by the at least one surroundings sensor (14, 16, 18) mirroring and/or reflecting off another motor vehicle (26) different from the host motor vehicle (12), or another reflective surface,
associating a virtual position and/or a virtual speed with the detected object, based on the emitted signal mirroring and/or reflecting off the another motor vehicle (26) or the another reflective surface,
determining whether the detected object corresponds to a non-existent another object, corresponding to a reflection of the signal emitted by the host motor vehicle from the another reflective surface, or a real object, corresponding to the another motor vehicle, situated at least partially outside a direct detection range of the at least one surroundings sensor (14, 16, 18) in the surroundings of the host motor vehicle (12), based on the provided surroundings data, the virtual position, and/or the virtual speed of the detected object,
removing the detected object in a case where it is determined that the detected object corresponds to the non-existent another object,
adapting the virtual position associated with the detected object in a case where it is determined that the detected object corresponds to the real object, based on driving-related information concerning the another motor vehicle (26) and driving-related information concerning the host motor vehicle (12), in order to determine an instantaneous position and/or an instantaneous speed of the real object corresponding with the detected object, and
responding to a passing operation of the real object by relying on the determined instantaneous position and/or the determined instantaneous speed of the real object and without the real object being within a direct detection range of the at least one surroundings sensor (14, 16, 18) providing the surroundings data, wherein responding to the passing operation comprises controlling the host motor vehicle by preventing a lane change of the host motor vehicle in response to the determined instantaneous position and/or the determined instantaneous speed of the real object.

12. The control method according to claim 11, wherein controlling the host motor vehicle comprises warning a driver of the host motor vehicle in response to the driver initiating a passing operation.

13. The control system according to claim 1, wherein based on the determined instantaneous position and/or the determined instantaneous speed of the real object, the control system is further configured to warn a driver of the host motor vehicle about the driver initiating a passing operation.

14. The control system of claim 1, wherein the control system is configured to detect the detected object in front of the host motor vehicle and adapt the virtual position and/or the virtual speed position associated with the detected object in order to determine that the real object is behind the host motor vehicle.

15. The control method according to claim 11, wherein the virtual position of the detected object is in front of the host motor vehicle and the instantaneous position of the real object is behind the host motor vehicle.

16. The control method according to claim 1, wherein the another reflective surface includes one or more of a road sign or a sign gantry.

\* \* \* \* \*